United States Patent Office 2,831,884
Patented Apr. 22, 1958

2,831,884

PRODUCTION OF UNSATURATED OXOCARBOXYLIC ACID ESTERS

Horst Pommer and Wolfgang Arend, Ludwigshafen (Rhine), Germany, assignors to Badische Anilin- & Soda-Fabrik Aktiengesellschaft, Ludwigshafen (Rhine), Germany No Drawing. Application May 31, 1956
Serial No. 588,235

Claims priority, application Germany June 2, 1955

4 Claims. (Cl. 260—483)

This invention relates to an improved process for the production of unsaturated oxocarboxylic acid esters.

We have found that unsaturated oxocarboxylic acid esters of the Formula II are obtained by allowing glyoxalic acid esters or their hydrates or half-acetals to act in the presence of basic catalysts on oxo compounds of the general Formula I:

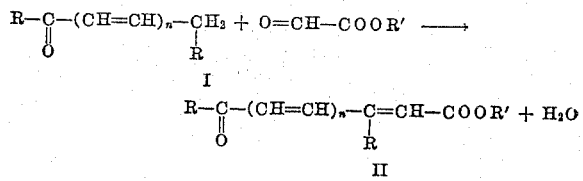

(R representing hydrogen or an alkyl, aralkyl, aryl or cycloalkyl group, R' an alkyl, aralkyl, cycloalkyl or aryl group, while $n$ represents zero, 1 or 2.)

Suitable initial materials of the Formula I are for example propionaldehyde (R=H, $n$=zero), ethylidene-acetophenone $C_6H_5$—CO—CH=CH—$CH_3$, crotylidene-acetophenone $C_6H_5$—CO—CH=CH—CH=CH—$CH_3$ or pentene-(2)-al-(1) $CH_3$—$CH_2$—CH=CH—CH=O.

Instead of the free glyoxalic acid esters, it is often advantageous to use their more conveniently accessible hydrates or semi-acetals, such for example as alpha-hydroxy-alpha-normal-butoxyacetic acid normal-butyl ester.

As basic catalysts there are suitable for example secondary or tertiary amines, such as diethylamine, dibutylamine, piperidine, pyrrolidine or pyridine as well as alkali carbonates. There are used from about 0.1 to about 10% by weight (with reference to the oxo compound of Formula I used) of said basic catalysts. The co-employment of indifferent solvents or diluents, such as benzene, toluene or dimethyltetrahydrofurane, is often advantageous.

The condensation takes place even at room temperature, but may be accelerated by heating, for example from 50° to 100° C. or in some cases even higher. It is often of advantage to remove the water formed continuously, for example by azeotropic distillation with benzene or toluene.

The unsaturated oxocarboxylic acid esters obtainable in this way are valuable intermediate products, especially for the synthesis of vitamin A and for other pharmaceutical products. Besides this they have valuable perfume properties.

The following examples will further illustrate this invention but the invention is not restricted to these examples. The parts specified are parts by weight.

Example 1

5 parts of di-normal-butylamine are allowed to flow during the course of 30 minutes into a mixture of 108 parts of glyoxalic acid ethyl ester and 70 parts of propionaldehyde which is boiling under reflux, the mixture thereby remaining boiling without further supply of heat. The whole is then further heated until the internal temperature has risen to about 95° C. The reaction mixture is then distilled with steam, whereby the 2-methylbutene-(2)-al-(1)-acid-(4)-ethyl ester passes over. It is separated from the aqueous layer of the distillate, dried and obtained pure by another distillation in which it passes over at 79° to 81° C. at a pressure of 10 torr in a yield of 78 parts. It is characterised by two maxima in the ultra-violet spectrum which in methanolic solution lie at 223 millimicrons ($\epsilon$=14,000) and 225 millimicrons ($\epsilon$=14,200). Its semicarbazone prepared in the usual way forms, when recrystallised from methanol, colorless needles of the melting point 227° to 228° C.

Example 2

1 part of piperidine is added to a mixture, heated to about 80° C., of 70 parts of alpha-hydroxy-alpha-normal-butoxy-acetic acid normal-butyl ester and 20 parts of propionaldehyde, the mixture thus heating up to 120° C. It is heated further for half an hour at about 120° C. and the mixture then subjected to fractional distillation. First the normal butanol and water split off pass over and then, under a pressure of 16 torr, the 2-methyl-butene-(2)-al-(1)-acid-(4)-normal-butyl ester at 116° to 118° C. The yield amounts to 35 parts. The semicarbazone prepared in the usual way melts at 190° C.

Example 3

2.5 parts of pyrrolidine or pyridine are allowed to drip during the course of 15 minutes into a mixture, heated to about 70° C., of 30 parts of alpha-hydroxy-alpha-ethoxy-acetic acid ethyl ester and 20 parts of propionaldehyde, the mixture thus heating up to about 110° C. It is then fractionally distilled, 18 parts of 2-methyl-butene-(2)-al-(1)-acid-(4)-ethyl ester of the boiling point 84° to 86° C. at 14 torr being obtained. It is identical with the product obtained according to Example 1.

Example 4

30 parts of pentene-(2)-al-(1) and 30 parts of alpha-hydroxy-alpha-ethoxyacetic acid ethyl ester are dissolved in 300 parts of benzene and heated to boiling at a separator. During the course of 30 minutes, 3 parts of di-normal-butylamine are dripped in and the whole further heated under reflux for 3 hours. Then the benzene is evaporated and the residue distilled with steam after the addition of 3 parts of oxalic acid. The steam distillate is extracted with ether, the ethereal solution dried over sodium sulfate and evaporated to dryness. The residue consists of 4-methyl-hexadiene-(2.4)-al-(1)-acid-(6)-ethyl ester. This ester, when recrystallized from cyclohexane, forms colorless needles of the melting point 58° C. and in methanolic solution exhibits an absorption maximum at 272 millimicrons ($\epsilon$=31,000). The yield amounts to 8 parts.

We claim:

1. An improved process for the production of unsaturated oxocarboxylic acid esters which comprises condensing an aldehyde selected from the class consisting of propionic aldehyde and pentene-(2)-al-(1) in the presence of from about 0.1 to about 10% by weight (with reference to the aldehyde used) of a basic catalyst with a glyoxalic acid ester of the general formula,

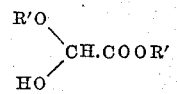

wherein R' represents a lower alkyl radical.

2. An improved process for the production of unsaturated oxocarboxylic acid esters which comprises condensing an oxo compound of the general formula $$H-\underset{O}{\underset{\|}{C}}-(CH=CH)_n-CH_2-R$$

in which R represents a member of the class consisting of hydrogen and a lower alkyl group and $n$ represents an integer of from zero to two, in the presense of from about 0.1 to about 10% by weight (with reference to the aldehyde used) of a basic catalyst with a glyoxalic acid ester semi-acetal of the general formula

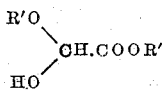

wherein R' represents a lower alkyl radical.

3. An improved process for the production of 2-methyl-butene-(2)-al-(1)-acid-(4) lower alkyl esters which comprises adding at from about 70° C. up to boiling temperature to a mixture of about equimolecular amounts of propionic aldehyde and a glyoxalic acid ester semi-acetal as in claim 1, from about 0.1 to about 10% by weight of a basic catalyst selected from the class consisting of secondary and tertiary amines.

4. An improved process for the production of 4-methyl-hexadiene-(2.4)-al-(1)-acid-(6) lower alkyl esters which comprises adding at from about 70° C. up to boiling temperature to a mixture of about equivalent amounts of pentene-(2)-al-(1) and a glyoxalic acid ester semi-acetal as in claim 1, from about 0.1 to about 10% by weight of a basic catalyst selected from the class consisting of secondary and tertiary amines.

References Cited in the file of this patent

Traube: Chem. Mer., 40 (1907), pp. 4942–56.
Phillips: J. Am. Chem. Soc., 76 (1954), pp. 5385–8.